(12) United States Patent
Borisov

(10) Patent No.: US 6,273,054 B1
(45) Date of Patent: Aug. 14, 2001

(54) INTERNAL COMBUSTION ROTOR-PISTON ENGINE

(75) Inventor: Eugenji Borisov, Vaduz (LI)

(73) Assignee: Firma Planetarische Motoren Aktiengesellschaft, Vaduz (LI)

( * ) Notice: Subject to any disclaimer, the term of this patent is extended or adjusted under 35 U.S.C. 154(b) by 0 days.

(21) Appl. No.: 09/400,517

(22) Filed: Sep. 16, 1999

(30) Foreign Application Priority Data

Sep. 16, 1998 (RU) .................................................. 98117186

(51) Int. Cl.$^7$ ...................................................... F02B 53/00
(52) U.S. Cl. ............................................ 123/221; 418/207
(58) Field of Search ............................... 123/221; 418/207

(56) References Cited

U.S. PATENT DOCUMENTS

| 3,809,022 | 5/1974 | Dean | ..................... 123/221 |
| 5,293,849 | 3/1994 | Huckert . | |

FOREIGN PATENT DOCUMENTS

| 886542 | 6/1954 | (DE) | ..................... 123/221 |
| 91975 | 10/1983 | (EP) . | |
| 365105 | 9/1906 | (FR) . | |
| 1560730 | 4/1990 | (SU) | ..................... 418/207 |
| 1772375 | 10/1992 | (SU) | ..................... 418/207 |
| WO91/14859 | 10/1991 | (WO) . | |

*Primary Examiner*—Michael Koczo
(74) *Attorney, Agent, or Firm*—Robert W. Becker & Associates; Robert W. Becker

(57) ABSTRACT

An internal combustion rotor-piston engine has a main body embedding two intersecting torus-like cavities. Each cavity guides two arc-shaped pistons. A main driving shaft has a central spherical part allocating four slots under a certain angle with the axis of the main driving shaft. Each of the four pistons has two butt-end surfaces and is connected with the main driving shaft by four coupling devices with an arc-shaped sector moving along the corresponding slot on the spherical part of the main driving shaft and a pin extending into the piston, for transmitting torque to the main driving shaft. The internal combustion rotor-piston engine further has a common outlet window for the two intersecting cavities and a common outlet window for the two intersecting cavities joining an outlet pipe. Each piston has a built-in chamber of combustion on the rear part thereof.

9 Claims, 4 Drawing Sheets

INTERNAL COMBUSTION ROTOR-PISTON ENGINE

BACKGROUND OF THE INVENTION

The present invention relates to mechanical engineering and particularly to the engine-building industry and is useful in the transportation industry.

From SU-A-1772 375, it is known to provide a rotor-combustion engine with two intersecting circular cylinders with pistons inside, two diametrically opposite input/output or inlet/outlet chambers, one pair of each per cylinder, a driving shaft and a synchro system consisting of two hinges each having a cylinder cam and a disk with a through hole, the axis thereof being perpendicular to the longitudinal axis of the cylinder, the body having a spherical cavity and two through diameter channels with conical section, the driving shaft having a central spherical part, two opposite conical and two cylinder parts attended by corresponding section of a body cavity. In the central spherical part of the driving shaft, there is a through slot tilted to the shaft axis and perpendicular to the through hole containing the cylinder cam.

Deficiencies in the design of this engine are the unbalanced mechanism and the difficulty to obtain gas sealing contacts of pistons during the phase of mutual contact because of the different velocity of their movements (the velocity of the piston which is running is higher than the velocity of the piston which is overtaken).

From WO-A2-98/19060 an internal combustion rotor-piston engine is known which has a main body with two intersecting circular cylinders in which are located the pistons. The main shaft is positioned in the central spherical shape of the body. In each cylinder there are two pistons, and in the central spherical part of the main shaft there are slots each one under a certain angle with the axis of the main shaft. The pistons are connected with the main shaft through images each of them including a sector part which can move inside the slot on the spherical surface of the main shaft and a pin which is positioned in the hole of the pistons. The chamber of combustion is inside the slots.

The present invention is designed to overcome the following disadvantages of prior art engines:
1. The configuration with the chambers of combustion inside cavities of the main shaft is very far from optimal (spherical or cylindrical), and the ramifications make them non effective with the tendency of the detonation. Also, this location of chamber of combustion is not effective for cooling and could cause overheating of the main shaft and failure of the engine.
2. The reduction of the output power because part of the working body is used for the compensation of the centrifugal forces of the rotating pistons.
3. Interfering sides of the pistons impair the function of the engine because of the different velocity of pistons during the interaction phase lasting about 37 angular degrees; running piston decelerates and overtaking piston accelerates, and despite the small difference in velocity, the final result is a grip of the pistons and the failure of the engine.
4. Because of the external preparation of the combustion mixture and because of the different pressure of exhaust gases and combustion mixture depending on working regime, part of the combustion mixture can flow through the outlet at high regimes and exhaust gas can flow through inlet window at middle and low regimes.

The object of the present invention is to provide an improved engine of the aforementioned kind which simplifies the construction and extends the reliability of the engine and its power and reduces both the fuel consumption and the amount of toxic components in the exhaust gas.

SUMMARY OF THE INVENTION

The invention provides an internal combustion rotor-piston engine that has the main body embedding two intersecting torus-like cavities (defined as cylinder only because of their function and not because of their geometrical shape), the two cylinders having two arc shaped pistons each, a main driving shaft with its central spherical part positioned in a corresponding spherical cavity in the body. In the spherical central part of the main shaft there are four slots under a certain angle with the axis of the main shaft, such slots connected to each other by calibrated holes. The pistons running inside the cylinders are connected with the main shaft by four coupling devices (shortly defined as hinges) composed of a solid arc shaped sector moving along the corresponding slot on the spherical part of the main shaft and of a pin that is allocated in the hole of the corresponding piston. At an extremity of the piston there is the combustion chamber having a circular hole on the external surface of the piston and a communication hole on the nearest butt-end of the piston, the profile of the cuts of the butt-end of the pistons are obtained in accordance with the kinematic laws in order to create a proper surface of interference. Corresponding to the sharp angles of these profiled butt-end sealing plates are inserted. Inlet and outlet windows are common to the two intersecting cylinders. Increased efficiency can take advantage of direct injection with an automatic compensation at different regimes realized by a channel system created inside the spherical part of the main driving shaft.

BRIEF DESCRIPTION OF THE DRAWINGS

Further details, features and advantages of the invention may be taken from the following description of an embodiment of the invention.

DESCRIPTION OF PREFERRED EMBODIMENTS

Figure 1:
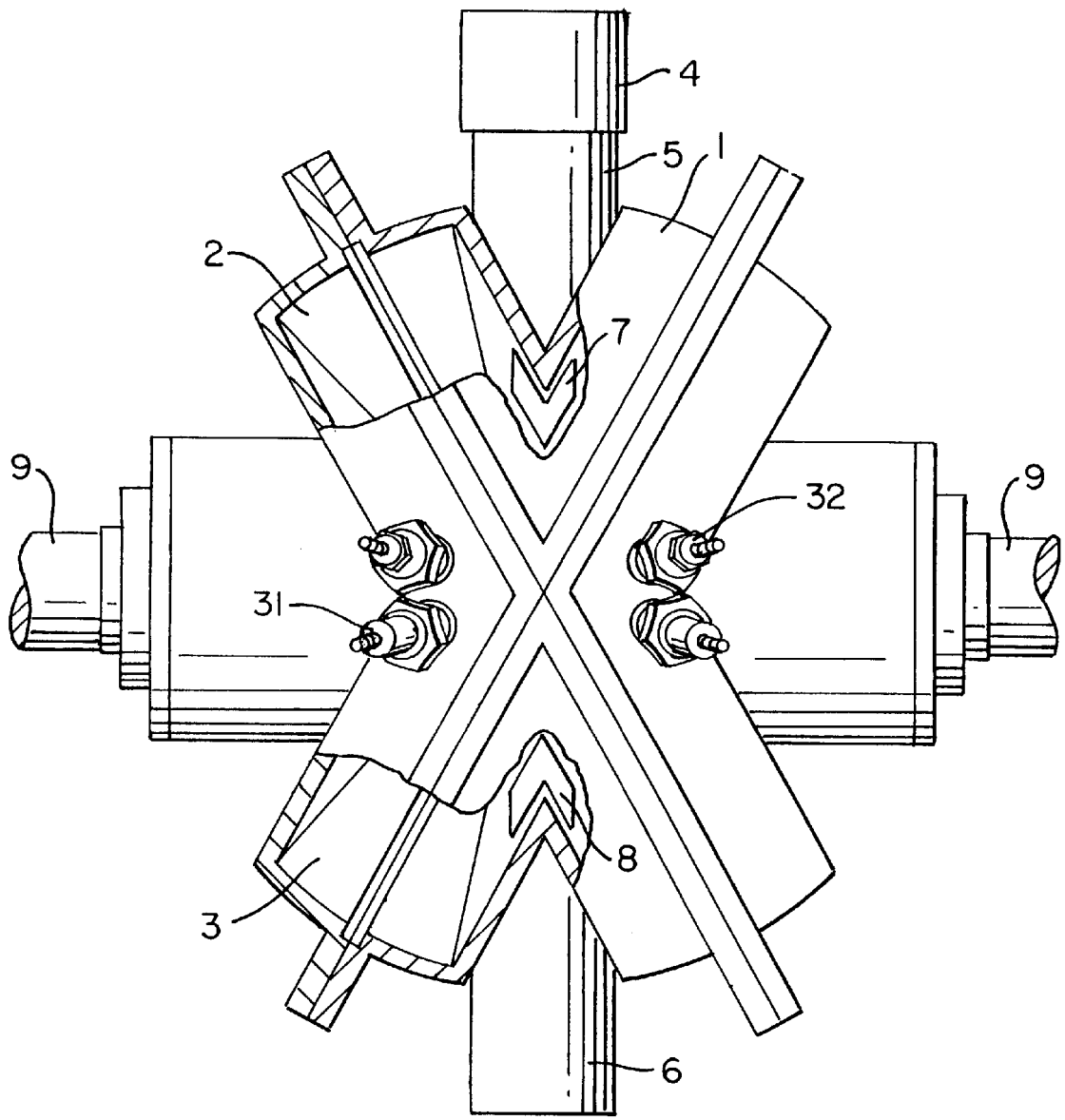
FIG. 1 shows a side view of an embodiment of the engine according to the invention.

The engine has an assembled body 1 (FIG.1) made of four parts. In the body 1, there are two intersecting torus-like cavities 2, 3, defined as cylinders because of their function. The cavities 2, 3 are characterized by a cross section having the shape of a part of annulus with a central angle of 30 angular degrees. The inlet pipe 5 supplying the inlet windows 7 is connected to a corresponding compressor 4. The outlet windows 8 are connected to the exhaust pipe 6. Inlet windows 7 and outlet windows 8 are common to both intersecting cylinders 2, 3 and are placed in correspondence of their two diametrically opposite crossing points. Inside the body 1 the main driving shaft 9 with a central spherical part 10 (FIG. 2) and two opposite cylindrical parts 11, 12 are positioned. Four arc-shaped pistons 13 are arranged inside the two intersecting cylinders 2, 3. Pistons 13 have two side surfaces 14, two specially profiled butt-end surfaces 15, and two external spherical surfaces. The two side surface 14 and the external spherical surface 16 of the pistons 13 match the cross section of the intersecting cylinders 2, 3 while the internal spherical surfaces of pistons match the spherical part 10 of the main driving shaft 9. Along the axis of the external spherical surface 16 of piston there is a rib 17 running in the corresponding slots on the external surface of the intersecting cylinders 2, 3 to minimize friction. The pistons have holes 18 for the pins 19 of coupling devices (hinges) 20 to couple pistons 13 with the main shaft 9. Such hinges 20 are made of a solid arc-shaped sector 21 and a pin 19.

Figure 4:
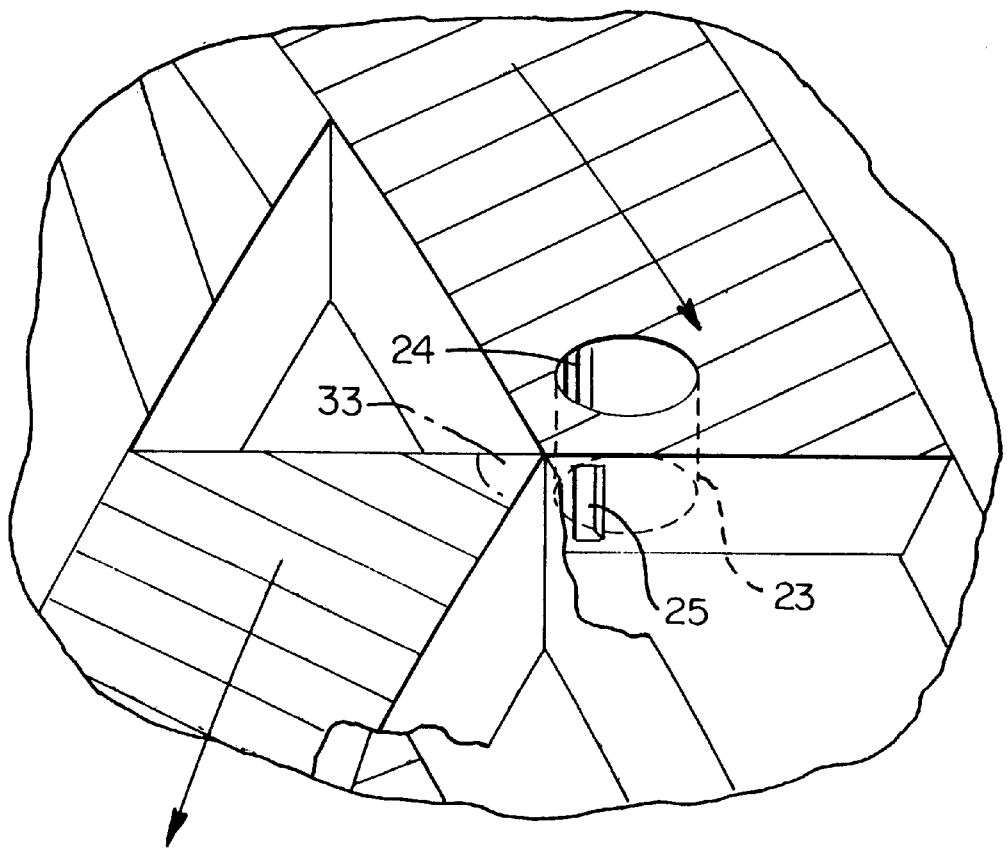
FIG. 4 is an enlarged view of a detail I of FIG. 3.
Figure 5:
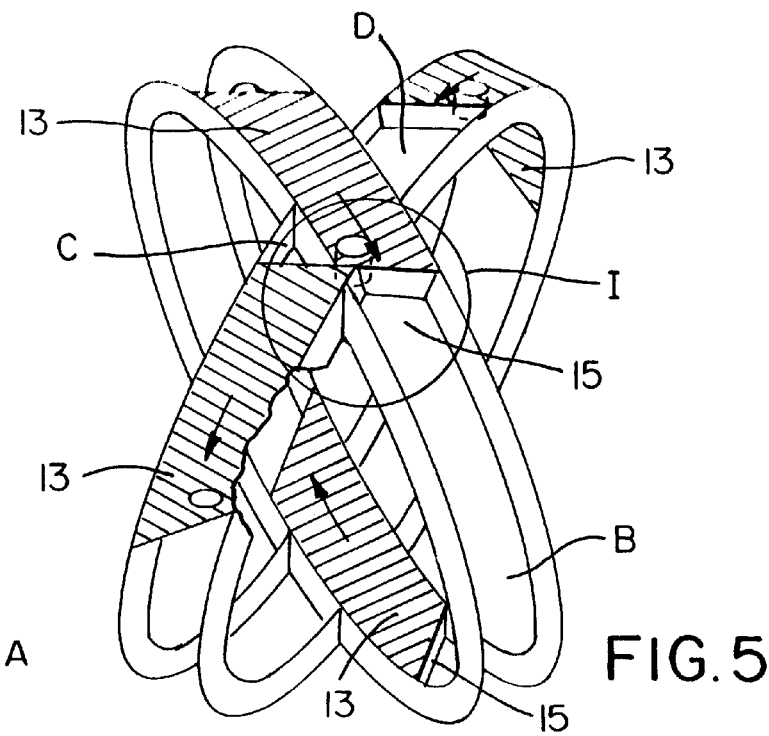
FIG. 5 is a view corresponding to FIG. 3, but shortly thereafter.
Figure 6:
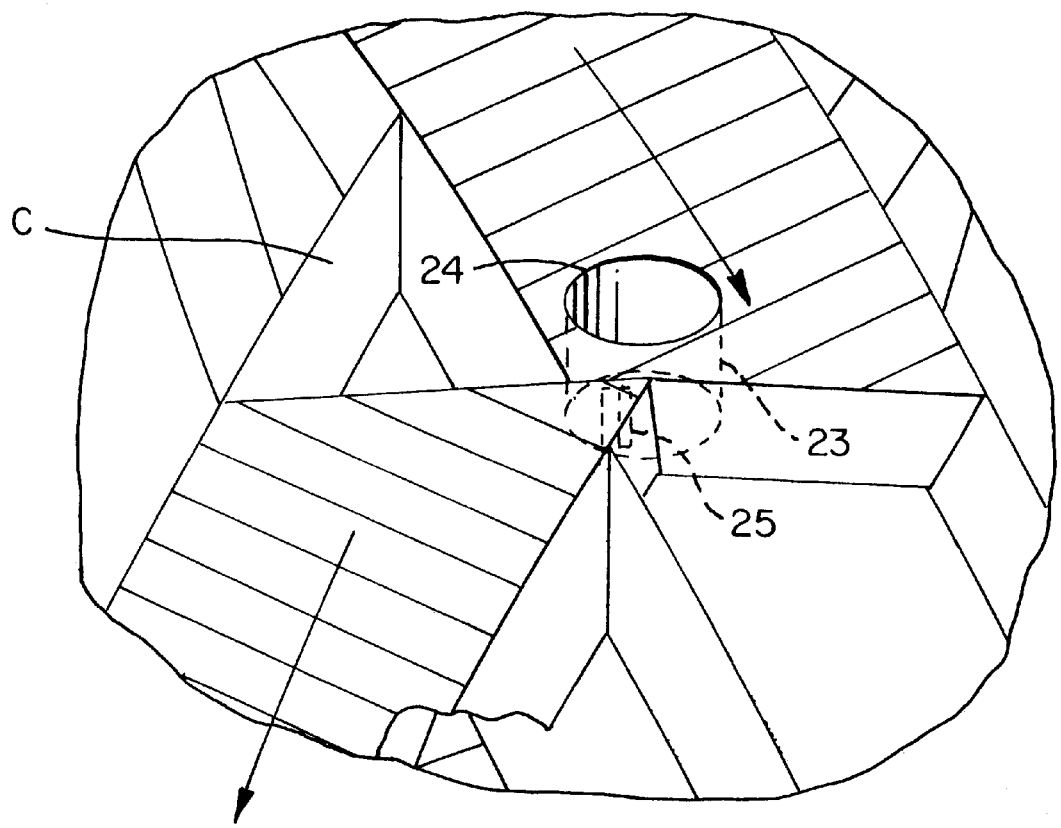
FIG. 6 is another view of the detail according to FIG. 4, but shortly before.

Referring to the sense of the rotation, on the rear part 22 of the piston there is realized the chamber of combustion 23, which has two holes: a hole 24 on the external spherical surface 16 and another hole 25 on the nearest profiled butt-end surface 15. At the two sharp angles 33 (FIGS. 4, 6) between the two profiled butt-end surface 15 and the adjacent side surfaces 14 there is inserted a sealing plate 26, 27, one each for each sharp angle 33.

On the spherical part 10 of the main driving shaft 9 there are four slots 29 with an angle to the longitudinal axis if the main driving shaft 9. In the slots 28 are allocated the arc-shaped sectors 21 of the hinges 20. The insertion of the arc-shaped sector 21 into the corresponding slot 28 divides each slot into two parts G, K. One of the parts G forms the air cavity and is connected with the other three via a channel 29 terminating with four calibrated holes 30. The other part K forms the oil cavity.

On the body there are two ignition or heating plugs 31 (FIG. 1) and two injectors 32 for fuel. Alternatively, spark plugs 31 are provided.

The device (internal combustion rotor piston engine) is working in the following way:

During operation, the four pistons 13 (FIG. 2) rotating inside the two intersecting cylinders 2, 3 (FIG. 1) are forming four cavities A, B, C, D (FIGS. 3, 4, 5, 6) changing continuously their volume and position thus providing the classical working strokes of an internal combustion engine: intake, compression, power, and exhaust.

Figure 2:
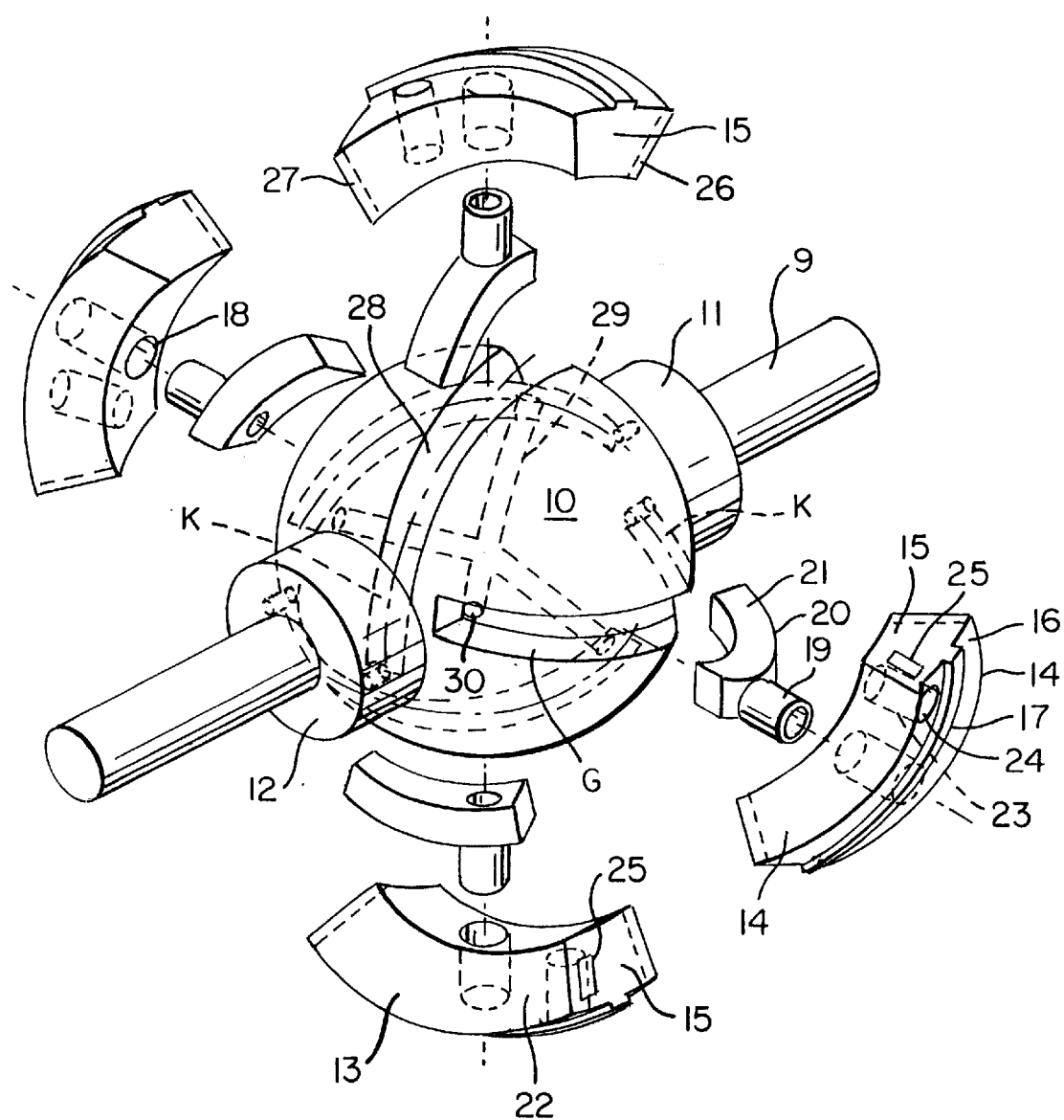
FIG. 2 shows an exploded view of the embodiment according to FIG. 1, but without the casing.
Figure 3:
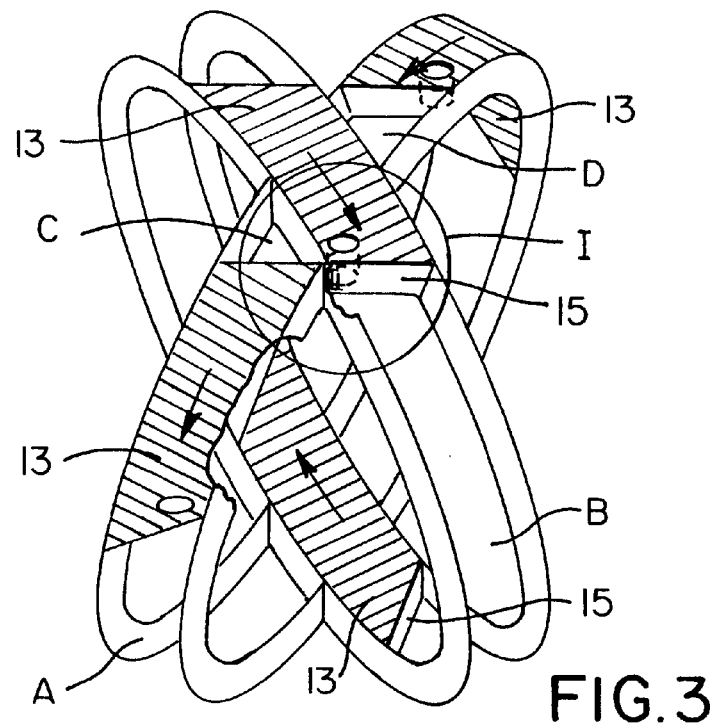
FIG. 3 shows a schematic view of the piston movement of the embodiment according to FIGS. 1 and 2.

Intake of charge in cavity B is terminated when the crossing piston 13 closes the inlet window 7 and immediately there after starts the compression of the charge. During the compression stroke an extra portion of the charge enters into cavity B through its correspondent calibrated hole 30 (FIG. 2). This extra portion of charge is coming from the cavity G delimited by the piston opposite to the one delimiting the cavity B. The path of the extra portion of charge is then: cavity G, calibrated hole 30 corresponding to cavity G, channel system 29 inside the spherical part 10 of the main driving shaft 9, calibrated hole 30 corresponding to cavity B, cavity B. In such way the extra portion of charge passing through the channel system 29 inside the spherical part 10 of the main driving shaft 10 provides cooling of the shaft while increasing its own temperature and finally the temperature of the overall charge in cavity B that is also filled better.

The quantity of the charge that enters cavities through the calibrated hole depends on the angular velocity of the main shaft 9: the higher is the velocity of the main shaft, the less the charge which enters through the calibrated holes 30 into cavity A so allowing to control the filling of the charge in the cavity. This improves features at the start and idle regimes and it decreases consumption and toxic exhaust at low and medium regimes.

At the beginning of the contact of the two crossing pistons 13 in cavity C the injection of fuel by the injector 32 begins. The fuel is mixed with the charge and under the influence of high temperature resulting from compression it evaporates.

The direct injection gives the possibility to optimize the preparation of the mixture increasing the efficiency of the engine and reducing the toxicity of the exhaust. Also, by using the direct injection of the fuel into cavity C the possibility of mixing of the mixture with the exhaust is eliminated at the moment of simultaneous opening of inlet windows 7 and outlet windows 8 as it could be in case of an outside preparation of mixture. To reduce the probability of entering of exhaust into cavity B, the inlet windows 7 and outlet window 8 are well separated by locating them opposite one another at sharp angles formed by the intersecting cylinders 2, 3.

As soon as the sharp angle 33 of one piston closes the hole 25 of the chamber of combustion 23 into the crossing piston, the mixture enters into the chamber of combustion 23 where the pressure and temperature are increasing to homogenize the combustion mixture.

During the period of time from the beginning of contact of pistons 13 and closing of hole 25, a small portion of the charge, which quantity depends on angular velocity of the main shaft, enters into cavity B providing an increase of the energy of the charge in the cavity under compression. This process for mixture preparation provides automatic control of the optimal proportion of charge and fuel mixture since the fuel quantity is constant. For example, the reduction of the load increases the angular velocity of the main shaft which causes an increase of charge entering into combustion chamber; because of this the mixture becomes leaner, the power of the engine decreases. On the other hand, increasing the load decreases the velocity of the main shaft and consequently decreases the charge entering the chamber of combustion so causing an enriched mixture and an increase of the output power of the engine.

When the hole 24 of the chamber of combustion 23 reaches the ignition plug, the mixture is ignited and the expansion stroke starts. The profiled butt-end 15 of the piston 13 and its plate seal 26, 27 are inserted in correspondence with the sharp angles 33 and interact with the corresponding surfaces, thus minimizing the clearance during working of the engine.

The compressor 4 provides effective ventilation of the combustion chambers; it also cleans the rear part of the body 1 from exhaust, thus so decreasing the temperature and the toxicity of the exhaust.

What is claimed is:

1. An internal combustion rotor-piston engine, comprising:
    a main body (1) having two intersecting cavities (2, 3);
    at least one arc-shaped piston (13) arranged in each said cavity, each of said at least one piston (13) having two buff-end surfaces, wherein each of said at least one piston (13) comprises an integrated chamber of combustion (23) on a rear part (22) thereof;
    a main driving shaft (9) comprising a central spherical part (10) having a plurality of slots (28) positioned at an angle relative to an axis of the main driving shaft (9);
    at least one coupling device (20) connecting a respective one of said at least one piston to the main drive shaft (9), each of said at least one coupling device comprising an arc-shaped sector adapted for movement along a corresponding one of said slots (28) and a pin (19) extending into a respective one of said at least one piston (13) for transmitting torque to the main drive shaft (9);

a common inlet window (7) for the two intersecting cavities (2, 3); and a common outlet window (8) for the two intersecting cavities (2, 3) joining an outlet pipe (6).

2. An engine according to claim 1, wherein each said integrated chamber of combustion (23) comprises a hole (25) formed in the nearest butt-end surface (15).

3. An engine according to claim 2, wherein said hole (25) and said integrated chamber of combustion (23) are arranged adjacent to and proximate to the rear part of another of said at least one piston.

4. An engine according to claim 1, wherein each said integrated chamber of combustion (23) comprises a cylindrical hole (24) extending substantially radially through a respective one of said at least one piston (13).

5. An engine according to claim 1, further comprising a first sealing plate (27) positioned on an angle (33) between a first one of said butt-end surfaces (15) and a first side surface (14) of each of said at least one piston and a second sealing plate (26) positioned on an angle (31) between a second one of said butt-end surfaces and a respective second side surface of each of said at least one piston.

6. An engine according to claim 1, further comprising a channel system (29) in the spherical part (10), said channel system (29) including a plurality of calibrated holes (30) for allowing ventilation between the slots (28) during movement of the at least one coupling device (20).

7. An engine according to claim 1, wherein said inlet window (7) and said outlet window (8) are located on two diametrically opposite intersections of the two intersecting cavities (2, 3).

8. An engine according to claim 1, further comprising an inlet pipe (5) and compressor (4), said compressor (4) arranged on said inlet pipe (5) proximate to the common inlet window (7) of the two intersecting cavities (2, 3).

9. An engine according to claim 1, further comprising a control device for controlling direct injection and ignition of said engine.

* * * * *